(12) United States Patent
Lorimor et al.

(10) Patent No.: US 10,037,552 B1
(45) Date of Patent: Jul. 31, 2018

(54) SYSTEMS AND METHODS FOR DISCOVERY AND TRACKING OF OBSCURED WEB-BASED ADVERTISEMENTS

(71) Applicant: Pathmatics, Inc., Santa Monica, CA (US)

(72) Inventors: Thomas George Lorimor, Santa Monica, CA (US); Gabriel Richard Gottlieb, Santa Monica, CA (US); Scott Daniel Carpenter, Los Angeles, CA (US)

(73) Assignee: PATHMATICS, INC., Santa Monica, CA (US)

( * ) Notice: Subject to any disclaimer, the term of this patent is extended or adjusted under 35 U.S.C. 154(b) by 573 days.

(21) Appl. No.: 14/490,536

(22) Filed: Sep. 18, 2014

(51) Int. Cl.
*G06Q 30/02* (2012.01)

(52) U.S. Cl.
CPC ..... *G06Q 30/0277* (2013.01); *G06Q 30/0246* (2013.01); *G06Q 30/0248* (2013.01)

(58) Field of Classification Search
CPC ................................ G06Q 30/0207–30/0277
USPC .............................................. 705/14.1–14.73
See application file for complete search history.

(56) References Cited

U.S. PATENT DOCUMENTS

2004/0249708 A1\* 12/2004 Jacobs ................. G06Q 10/107
705/14.73

\* cited by examiner

*Primary Examiner* — Sam Refai
(74) *Attorney, Agent, or Firm* — McDermott Will & Emery LLP

(57) ABSTRACT

Systems and methods are provided for discovering advertisements on publisher web pages and for determining whether the advertisements are obscured by other content on the web pages. An advertisement tracking and discovery system may use web crawler applications to explore multiple publisher websites. The web crawler applications may gather advertisement data that includes information associated with detected advertisements, placement pathways by which the advertisements were placed on the publisher web pages, and obscuration information for the detected advertisements. Obscured advertisements that have been detected may be ignored during advertisement tracking and discovery operations or obscuration information may be stored and provided with other advertisement information for the obscured advertisements. The advertisement data may be aggregated and formatted to be provided to a user. The provided data may include advertisement screenshots and web page screenshots containing the advertisements.

10 Claims, 14 Drawing Sheets

SYSTEMS AND METHODS FOR DISCOVERY AND TRACKING OF OBSCURED WEB-BASED ADVERTISEMENTS

BACKGROUND OF THE INVENTION

This invention relates generally to web-based information and, more specifically, to discovery and tracking of web-based advertisements.

Publisher websites such as newspaper web pages, television station web pages, web log web pages, magazine web pages, social networking web pages, microblogging web pages, and other internet-based online publishing sources often include advertisements for companies and products. Advertisements on a publisher website may include images, videos, text, animations, or other visual or audio messages. These advertisements are sometimes referred to as advertisement creatives.

Advertisements may be placed on a publisher web page by a variety of sources. A company may purchase an advertisement block on the publisher web page directly from the publisher, through an advertising network, through an advertising exchange, through a demand side platform (DSP) or through some combination of these or other advertising channels.

However, in some situations, when an advertisement is placed on a publisher web page, it is visibly obscured by another advertisement or other content on the web page. In these situations, an advertiser may believe that their advertisement is being viewed by users of the web page, when it is, in fact, visibly obscured by other content on the web page. Obscured advertisements of this type can negatively affect the advertiser by allowing the advertiser to pay for a service it is not receiving and to misinterpret the effectiveness of an advertising campaign.

It can also be difficult or impossible for a publisher, an advertising network, an advertising exchange, or advertising channel to determine directly the visibility of an advertisement on a particular web page to individual users of the web page, using, for example code included with an advertisement, because the layout and positioning of objects on the web page can be dependent on the application that renders the web page and on inaccessible portions of the code for the webpage.

It would therefore be desirable to be able to provide improved systems for discovering and tracking of internet-based advertisements that can distinguish between obscured and unobscured advertisements.

SUMMARY OF THE INVENTION

Systems and methods are provided for discovering and tracking obscured advertisements on published internet web pages.

An advertisement tracking and discovery system may include advertisement discovery equipment, storage such as cloud-based storage, internet proxy servers, data analysis and storage equipment, and user-interface equipment for discovering advertisements on publisher web pages, for determining the pathway by which each advertisement has been placed on a publisher web page, and for determining whether the advertisements are visibly obscured advertisements.

The advertisement discovery equipment may spider or crawl various publisher web pages by sending a Hypertext Transfer Protocol (HTTP) request to the Universal Resource Locator (URL) of each publisher website and each linked website or resource. The advertisement discovery equipment may gather and store HTTP request data associated with each HTTP request and may use time information associated with each HTTP request in combination with other information such as redirect response headers and response body information to discover advertisements and to determine pathways by which advertisements and other content were placed on a particular site.

For each detected advertisement, the advertisement discovery equipment may determine whether the advertisement is an unobscured (visible) advertisement or an obscured advertisement such as a partially visually obscured advertisement, a completely visually obscured advertisement, and/or a temporarily visually obscured advertisement. The advertisement discovery equipment may generate processed advertisement data including information indicating whether each advertisement is visible when displayed on the publisher web page.

For example, the advertisement discovery equipment may determine from the Document Object Model (DOM) associated with a publisher web page that a particular advertisement is located at a particular location on a web page, determine one or more test points within the location of the advertisement, obtain the visible element at each test point (e.g., by requesting the visible element at the test point with a web browser and/or web crawler of the advertisement discovery equipment), obtain an element of the advertisement at that test point, and compare the visible element to the advertisement element.

If the visible element matches the advertisement element, the advertisement discovery equipment may determine that the advertisement is visible at that test point. If the visible element does not match the advertisement element, the advertisement discovery equipment may determine that the advertisement is obscured (e.g., visibly obscured) at that test point. The advertisement discovery equipment may determine a ratio of obscured test points to visible test points and determine, based on the ratio, a score for that advertisement.

For example, the score may be a visible percentage of the advertisement. If the visible percentage is below a threshold, the advertisement discovery equipment may determine that the advertisement is obscured and may take suitable action for an obscured advertisement. If the visible percentage is above the threshold, the advertisement discovery equipment may determine that the advertisement is visible and may take suitable action for a visible advertisement.

The visible test points may also be used to determine a valid click point for the advertisement discovery equipment to follow a link associated with the advertisement to, for example, determine a landing page of the advertisement.

The data analysis and storage equipment may receive and accumulate processed advertisement data from computing equipment associated with various installations of advertisement discovery equipment in various geographic locations and combine the accumulated processed advertisement data to form user accessible aggregated advertisement data that includes obscured advertisement data.

The obscured advertisement data may include screenshots of unobscured advertisements as shown on publisher web pages, screenshots of the publisher web pages containing the unobscured advertisements, obscured advertisement flag values corresponding to obscured ads, screenshots of obscured advertisements as shown on publisher web pages, and/or screenshots of the publisher web pages containing the obscured advertisements, as examples.

The data analysis and storage equipment may provide the aggregated advertisement data including the obscured advertisement data to the user-interface equipment for access by a customer. If desired, the data analysis and storage equipment may provide a portion of the aggregated data directly to the customer by generating an email, text message, social media message, or other direct contact message containing some or all of the aggregated data. The data analysis and storage equipment and/or the user interface equipment may notify customers of updates periodically or in response to a detected change in one or more portions of the aggregated data.

Further features of the invention, its nature and various advantages will be more apparent from the accompanying drawings and the following detailed description of the preferred embodiments.

DETAILED DESCRIPTION

The present invention relates generally to systems and methods for identifying advertisements online and, more particularly, to systems for identifying obscured advertisements on publisher websites. Advertisements such unobscured and/or obscured advertisements, and the pathways by which the advertisements have been placed on publisher websites, may be discovered using an advertisement tracking and discovery system.

The system may include advertisement discovery equipment and other computing equipment for gathering information related to the location of various elements on a publisher web page and determining whether particular elements such as advertisements on the web page are visible to a user or are obscured by other elements. The system may use data analysis and storage equipment or other computing equipment to process, aggregate and provide customer access to the gathered advertisement information based, in part, on obscuration information for the advertisements. In some embodiments, some or all of the obscuration information may also be provided to a customer.

Figure 1:
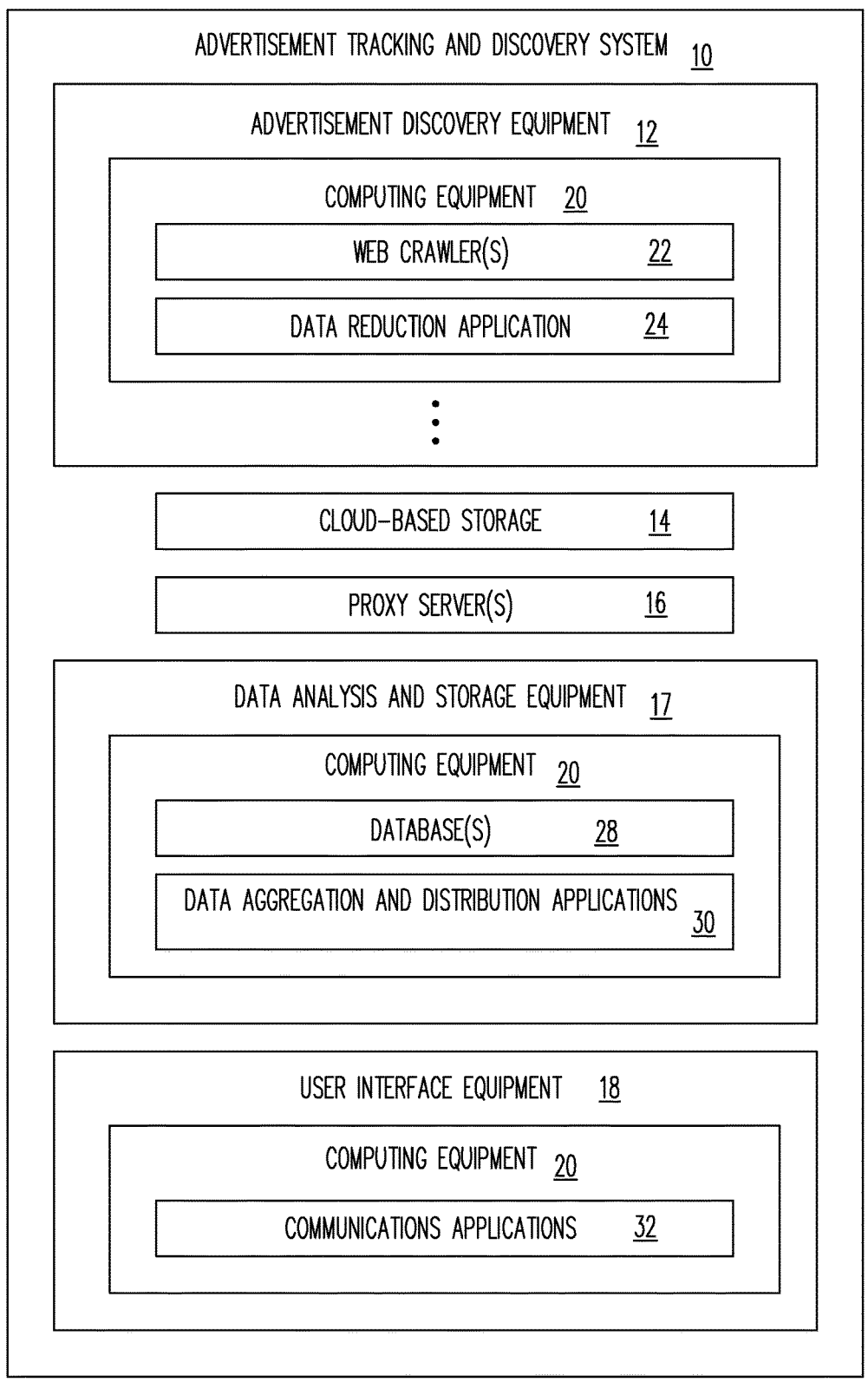
FIG. 1 is a diagram of an illustrative system for discovering and tracking web-based obscured advertisements in accordance with an embodiment of the present invention.

An illustrative advertisement tracking and discovery system 10 is shown in FIG. 1. Advertisement tracking and discovery system 10 may include advertisement discovery equipment 12, one or more databases such as cloud-based storage 14, remote servers such as proxy servers 16, data analysis and storage equipment 17, user interface equipment 18 or other computing equipment.

Advertisement discovery equipment 12 may include computing equipment 20. Computing equipment 20 may include one or more personal computers, workstations, computers configured as servers, mainframe computers, portable computers, etc. Computing equipment 20 may include processing circuitry, communications circuitry, displays, input-output devices, and storage (e.g., hard drives, volatile memory, non-volatile memory, and/or other storage media or non-transitory computer-readable media including contents that can be executed by a computing system). Computing equipment 20 of advertisement discovery equipment 12 may be used to run code for software applications such as one or more web crawling applications 22 and data processing applications such as data reduction application 24. Data reduction application 24 may be used to process advertisement related data that has been gathered using web crawler(s) 22 (e.g., modified web crawling web browsers or dedicated web crawling applications).

System 10 may include storage that is co-located with computing equipment 20 of system 10 and/or remote storage such as cloud-based storage 14. If desired, advertisement discovery equipment 12 and/or data analysis and storage equipment 17 may be used to access stored information from cloud-based storage 14 and/or provide information to cloud-based storage 14. Cloud-based storage 14 may include storage media such as hard drives, volatile memory, non-volatile memory, and other storage media associated with workstations, computers configured as servers, mainframe computers, portable computers, etc.

Data analysis and storage equipment 17 may include computing equipment 20. Computing equipment 20 of data analysis and storage equipment 17 may be co-located with computing equipment 20 of advertisement discovery equipment 12 or computing equipment 20 of data analysis and storage equipment 17 may be separate from computing equipment 20 of advertisement discovery equipment 12.

As examples, computing equipment 20 of data analysis and storage equipment 17 and computing equipment 20 of advertisement discovery equipment 12 may be implemented using a common computing platform, using separate computing platforms in a common room in a building, using separate computing platforms in separate rooms in a common building or using separate computing platforms in a common geographic location (e.g., a common city). However, this is merely illustrative. If desired, computing equipment 20 of advertisement discovery equipment 12 may include multiple computing platforms in multiple geographic locations that are separated from computing equipment 20 of data analysis and storage equipment 17. As examples, computing equipment 20 of advertisement discovery equipment 12 may include separate computing platforms in multiple cities that provide advertisement data to data analysis and storage equipment 17 that is located in an additional city.

Advertisement discovery equipment 12 may use web crawler(s) 22 to access and explore publisher web pages, gather advertisement related data from those publisher web pages, process the gathered data, and provide the processed data to data analysis and storage equipment 17. Data analysis and storage equipment 17 may be used to accumulate, aggregate, and store advertisement related data.

Computing equipment 20 of data analysis and storage equipment 17 may include storage such as one or more databases 28 and other computing equipment (e.g., one or more personal computers, workstations, computers configured as servers, mainframe computers, portable computers, processing circuitry, displays and input-output devices) that can be used to run code for software applications such as one or more data aggregation and distribution applications 30. Data aggregation and distribution applications 30 may be used to accumulate and aggregate data received from advertisement discovery equipment 12 and, if desired, to generate customer alert notifications.

User interface equipment 18 may be used to provide a customer with access to advertisement related information such as aggregated advertisement data stored in data analysis and storage equipment 17. Computing equipment 20 of user interface equipment 18 may include one or more personal computers, workstations, computers configured as servers, mainframe computers, portable computers, etc.

Computing equipment 20 of user interface equipment 18 may include processing circuitry, communications circuitry, displays, input-output devices, and storage (e.g., hard drives, volatile memory, non-volatile memory, and other storage media). Computing equipment 20 of user interface equipment 18 may form a portion of computing equipment 20 of data analysis and storage equipment 17 or may be formed separately from computing equipment 20 of data analysis and storage equipment 17.

Computing equipment 20 of user interface equipment 18 may be used to run code for software applications such as one or more communications applications 32. Communications applications 32 may be used to provide customers with access to advertisement related information such as aggregated advertisement data that is stored in data analysis and storage equipment 17.

Communications applications 32 may include a web portal for providing authenticated web access to portions of data stored in data analysis and storage equipment 17 (e.g., using a customer's web browser or other application on a customer's device), a file-transfer-protocol application for providing bulk access to portions of data stored in data analysis and storage equipment 17, an Application Programming Interface (API), and/or an email, text message, social media message, or other direct message generating application that generates and sends alert notifications to customers (e.g., periodic alert notifications and/or notifications generated in response to a detected change in advertisement related information).

Figure 2:
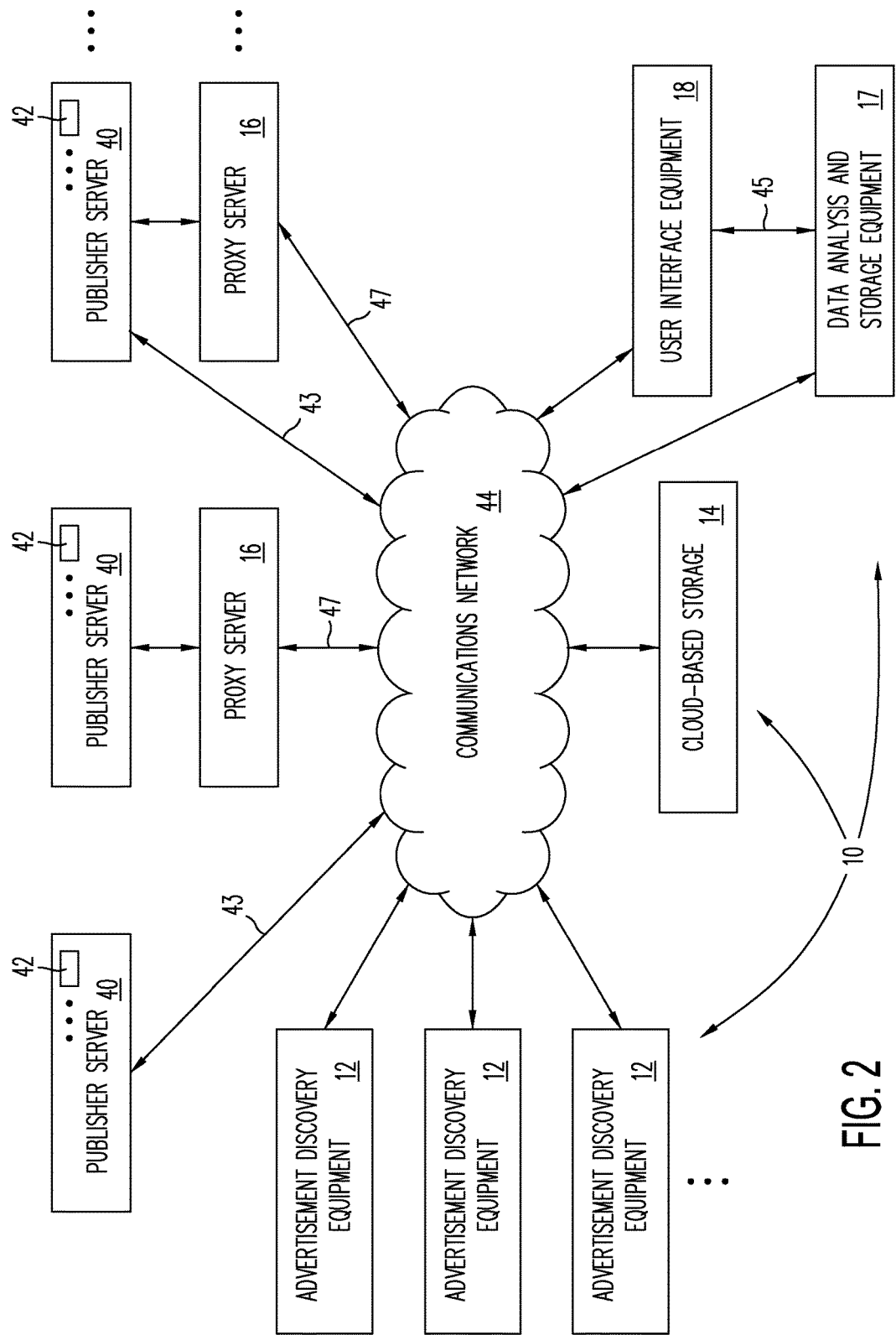
FIG. 2 is an illustrative diagram showing how portions of a system of the type shown in FIG. 1 may communicate with other portions of the system and with publisher servers over a communications network in accordance with an embodiment of the present invention.

FIG. 2 shows how portions of system 10 may communicate with other portions of system 10 and/or with publisher computing equipment such as publisher servers 40 over a communications network such as communications network 44. Communications network 44 may be a local area network, a wide area network such as the Internet, or a combination of one or more local area networks and a wide area network.

As shown in FIG. 2, system 10 may include multiple implementations of advertising and discovery equipment 12 connected to one or more of multiple publisher servers 40 over network 44.

One or more web crawlers 22 running on each implementation of advertisement discovery equipment 12 may be used to access and explore one or more publisher web pages 42 that are hosted on publisher servers 40. If desired, web crawlers 22 running on computing equipment 20 of advertisement discovery equipment 12 in one geographic location (e.g., a country or a region of a country) may be used to access and explore publisher web pages in that geographic location. However, this is merely illustrative. If desired, web crawling applications 22 running on computing equipment 20 of advertisement discovery equipment 12 in one geographic location may access publisher servers 40 in another geographic location (e.g., another country or another region of a country) directly (as indicated by lines 43) or though a proxy server 16 (as indicated by lines 47) that is located in a common geographic location (e.g., a common country or region of a country) with those publisher servers 40.

During operation of system 10, advertisement discovery equipment 12 may obtain a list of universal resource locators (URLs) of publisher websites 42 to be explored from cloud-based storage 14. Web crawlers running on advertisement discovery equipment 12 may then access the websites associated with those obtained URLs and each linked web page, resource, or application associated with those URLs. However, this is merely illustrative. If desired, advertisement discovery equipment 12 may be used to generate the list of URLs to be explored. As examples, advertisement discovery equipment 12 may be provided with a single publisher URL and generate a list of related publisher URLs to be explored by crawling (spidering) the single publisher URL or advertisement discovery equipment 12 may access a publisher website associated with a URL that has been previously accessed and generate a list of related publisher URLs to be explored by re-crawling the previously accessed publisher URL.

In some embodiments, advertisement discovery equipment 12 may load set of cookies associated with a selected profile of a particular type of internet user into one of web crawlers 22 prior to accessing and exploring a particular web page. In this way, advertisement discovery equipment 12 can simulate a user having user traits associated with that particular type of user profile accessing and exploring the publisher web page and can detect advertisements, advertisement channels, and obscured advertisements that may be presented to that particular type of user.

Advertisement discovery equipment 12 may gather advertisement data associated with each URL and process the gathered data to identify advertisements associated with each URL and additional information such as obscuration information for elements on the web page associated with that URL and/or advertising channels responsible for placing those advertisements on the web page associated with that URL.

In some situations, advertisements such as advertiser-related images, videos, flash content, text links, or other advertisements are placed on a publisher's web page by the publisher itself. In other situations, a publisher may sell advertising space to third party companies that sell that advertising space to advertisers and advertisements may be placed on the publisher web page by the third party company. Third party companies may include services such as advertising networks, advertising exchanges, demand side platforms (DSPs), yield optimizers, data platforms, and advertiser advertising servers.

Advertising discovery equipment 12 may identify advertisements associated with each URL and advertising channels responsible for placing those advertisements by recording each individual request made in the loading of the a publisher website. These requests may be for content of many forms (e.g., image content, text content, binary content, etc.) which may be used for many different purposes (e.g., information for a user, advertisements, data gathering, etc.).

Advertising discovery equipment 12 may process the recorded requests and responses associated with the requests and identify a cause and effect relationship between the one or more requests and/or one or more groups of requests. In the process of loading a website 42, one request may cause other requests to be made. For example, when a Hypertext Markup Language (HTML) page is loaded, it may include references to other HTML, JavaScript, Adobe Flash®, or other resources to be loaded. In order to fully load the website, these referenced resources may also be loaded.

A cause and effect relationship may then be identified between the original HTML page that was loaded (in this example) and other referenced resources. These cause and effect relationships may be used to identify placement pathways by which content has been placed on a publisher website.

In some situations, some content such as advertisements on a publisher web page may be obscured by other content such as publisher content and/or other advertisements (as examples). Content can be obscured in this way due to an error in the code of the web page or due to a publisher or advertising channel selling the same space to multiple advertisers. Regardless of the reason, it may be desirable for advertisers, advertising channels, and/or publishers to be able to determine whether content on the publisher web page that is expected to be visible is actually visible or is obscured. It can be difficult for a publisher or advertising channel itself to determine whether an advertisement will be obscured since, for example, the publisher may not have access to content within an iframe on the publisher web page and/or an advertising channel that provides content within an iframe may not have access to other content on the web page.

Moreover, an advertisement discovery and tracking system may provide users such as customers with information about displayed advertisements on publisher web pages and the provided information may be determined based in part on whether the advertisements are obscured. For example, an advertisement discovery and tracking system may provide a user with an image such as a screenshot of an advertisement that is displayed on the publisher web page or a screenshot of a portion of a publisher web page that includes the advertisement. However, if the advertisement is obscured, an image of the advertisement may be undesirable. Moreover, information indicating that the advertisement is obscured may be desirable. Advertisement discovery equipment 12 may therefore detect obscured content such as obscured advertisements and may gather and provide processed advertisement data and, if desired, obscuration data to data analysis and storage equipment 17 based at least in part on whether obscured content is detected.

Data analysis and storage equipment may, if desired, further process and store the received processed advertisement data and/or obscuration data. User interface equipment 18 may be used to provide customer access to the advertisement related data stored by data analysis and storage equipment 17. User interface equipment 18 may be connected to data analysis and storage equipment 17 through network 44 or through a direct connection (as indicated by line 45).

Figure 3:
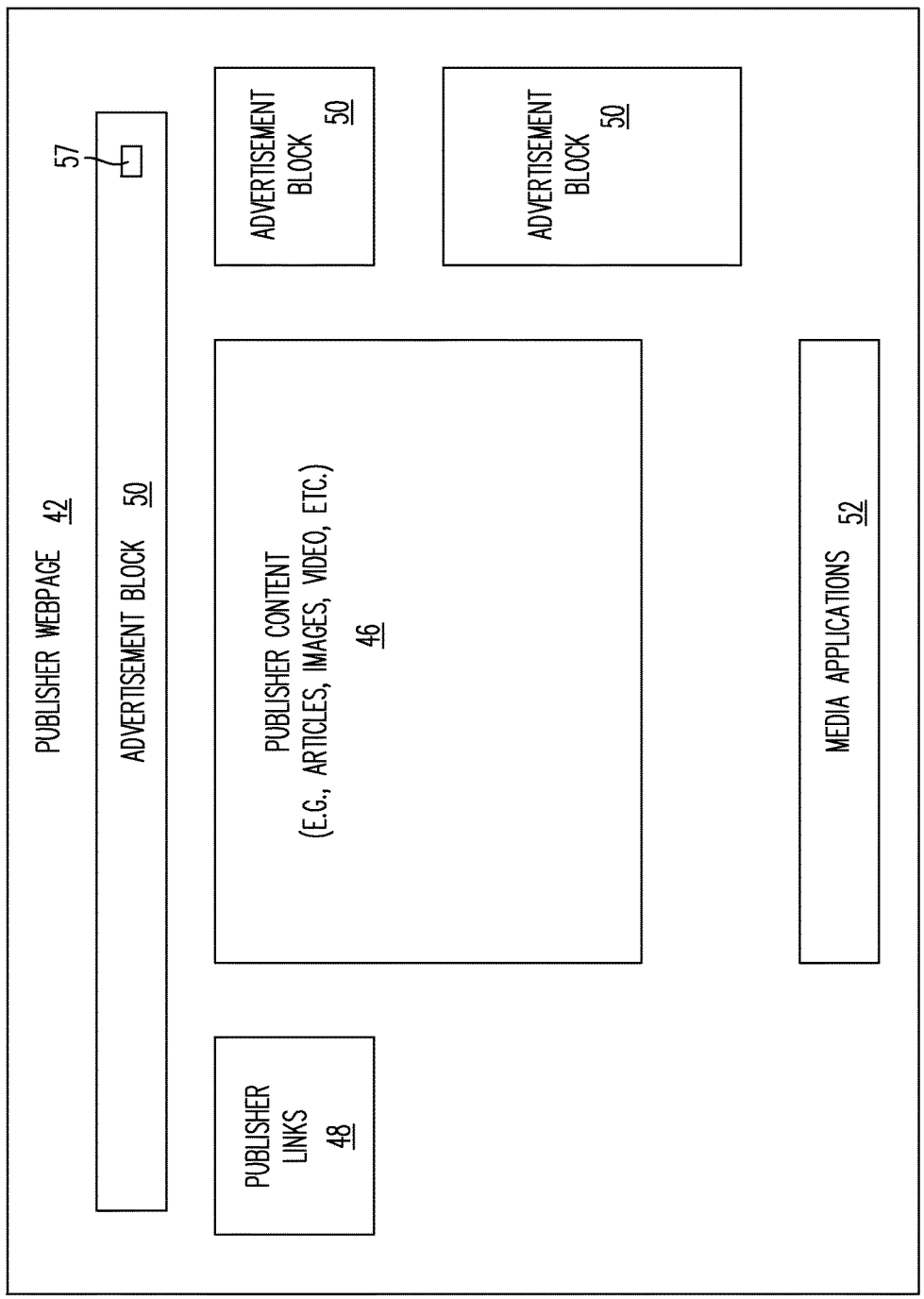
FIG. 3 is a diagram of a common publisher web page that can be hosted on a publisher server and that includes publisher content, media applications, publisher links, and one or more advertisement blocks.

FIG. 3 is a diagram of a typical publisher website. As shown in FIG. 3, publisher web page 42 may include publisher content 46 (e.g., an article, a movie or an image), publisher links 48 (e.g., clickable links to other publisher web pages), media applications 52 (e.g., social networking applications) and one or more advertisement blocks 50. Each advertisement block 50 may include one or more advertisements 57 such as advertiser-related images, videos, animations, text links, or other advertisements.

Advertisements may sometimes be referred to as advertiser creatives or simply as creatives. For example, an advertiser creative may include a jpeg image of a product and an embedded clickable link to a web site that sells that product. System 10 may be used to identify advertisement blocks 50, to identify advertisers that advertise in those advertisement blocks, to record individual advertiser creatives or text links displayed in those advertisement blocks, and to identify advertising channels that placed those advertiser creatives or text links in those advertisement blocks. System 10 may be used to compile, analyze and display advertisement data associated with advertisements, advertisers, advertising channels and publishers to a customer.

Figure 4:
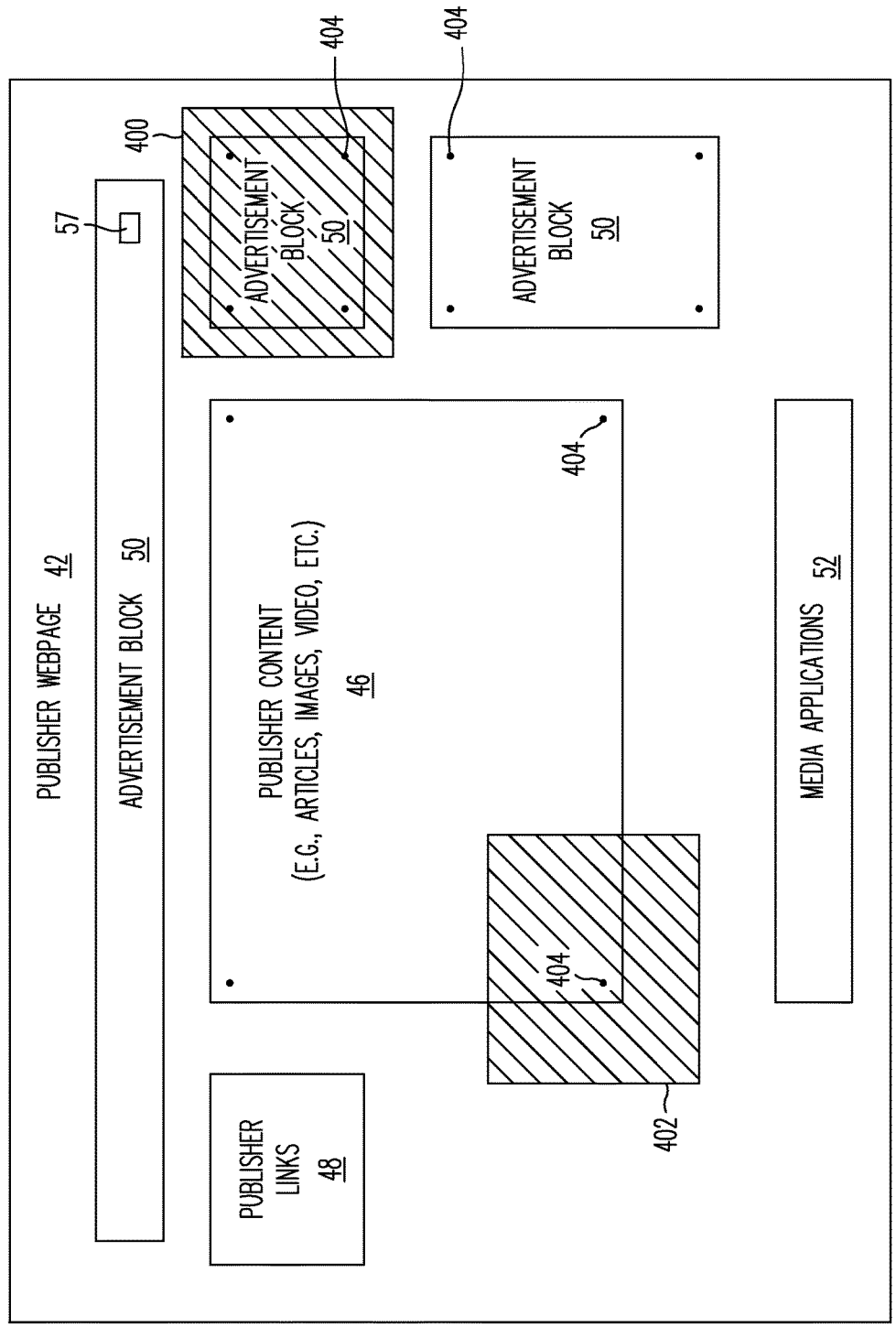
FIG. 4 is a diagram of publisher web page having obscured content that may be detected using the system and methods described herein in accordance with an embodiment of the present invention.

As shown in FIG. 4, some of the content on a publisher web page may be obscured. In the example of FIG. 4, publisher content 46 is partially obscured by obscuring element 402 and one of advertisement blocks 50 is completely obscured by obscuring element 400. An obscured element may be any element having one or more visible elements arranged in front of the obscured element so that the obscured element (or a portion thereof) would not be visible (i.e., would be visibly obscured) to a user looking at the web page because the visible element that is arranged in front of the obscured element covers the obscured element thereby blocking the obscured element from being viewed. Obscuring elements 400 and 402 may be placed on web page 42 by the publisher, by an advertising channel, or otherwise placed on the web page. Obscuring elements 400 and 402 may be advertisements, publisher content, or other content and may be static content or dynamic content (e.g., content that changes size and/or position with time). Various test points such as test points 404 may be used to determine whether a particular element of a web page is obscured.

FIGS. 5, 6, 7, 8, and 9 show various advertisement obscurations that may be detected using a system such as system 10 of FIG. 1.

Figure 5:
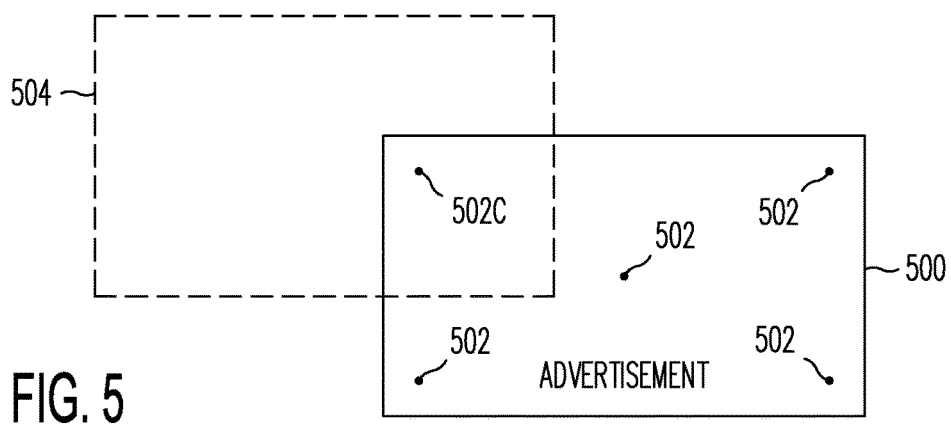
FIG. 5 is an illustrative diagram showing a partially obscured advertisement that may be detected, in accordance with an embodiment of the present invention.

In the example of FIG. 5, an advertisement 500 is partially obscured by a static obscuring element 504. A system such as system 10 may be used to determine, at various test points 502 within the area of advertisement 500, whether advertisement 500 is the visible (e.g., topmost) element on a web page at that test point. In the example of FIG. 5, advertisement 500 is the topmost element at four of the five exemplary test points and obscuring element 504 is the topmost element at test point 502C. By determining that obscuring element 504 is the topmost element at test point 502C, the system may determine that advertisement 500 is at least partially obscured.

Figure 6:
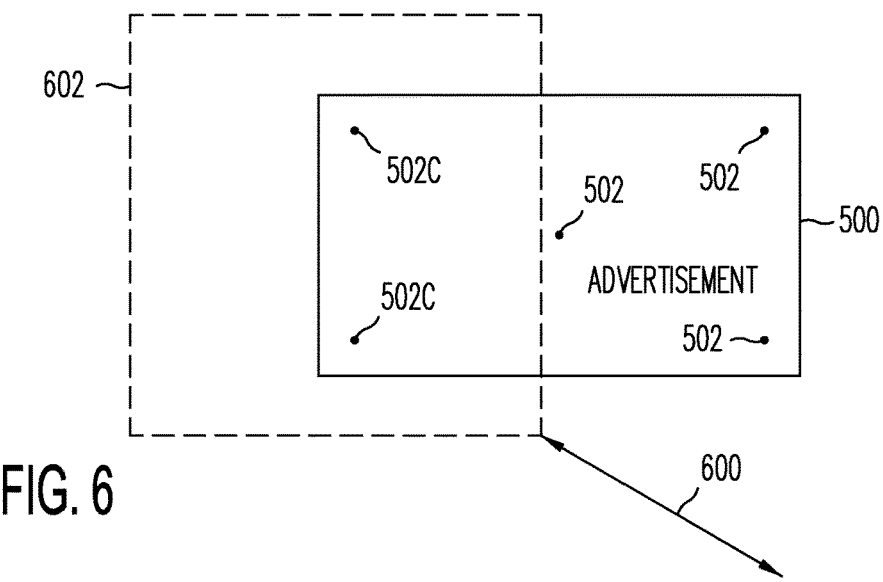
FIG. 6 is an illustrative diagram showing an advertisement that is obscured by a dynamically sized obscuring element that may be detected, in accordance with an embodiment of the present invention.
Figure 7:
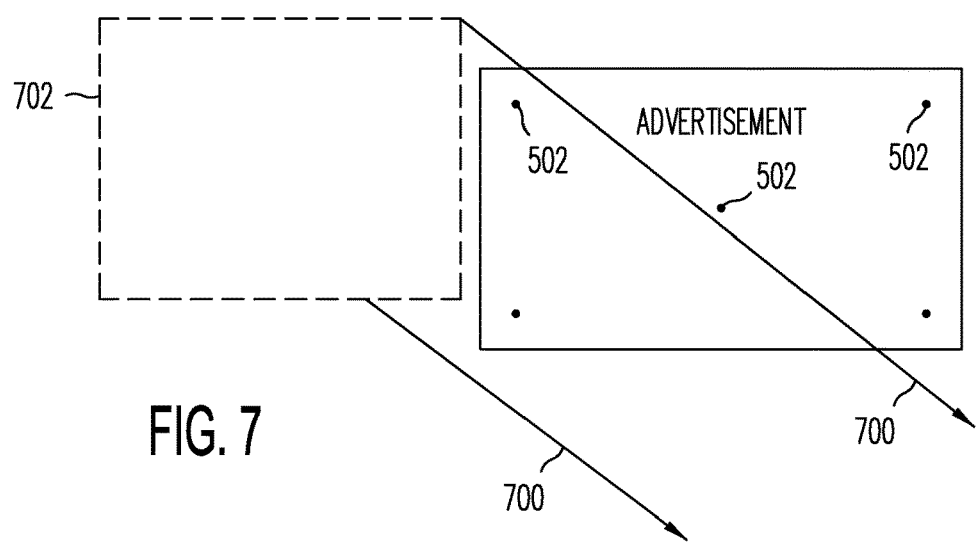
FIG. 7 is an illustrative diagram showing an advertisement that is obscured by a moving obscuring element that may be detected, in accordance with an embodiment of the present invention.

In the examples of FIGS. 6 and 7, advertisement 500 is obscured by dynamic obscuring elements such as an expanding and/or contracting element 602 (FIG. 6, as indicated by arrows 600) and a moving element 702 (FIG. 7, as indicated by arrows 700) that obscure some or all of advertisement 500 at various times. In order to determine that advertisement 500 is obscured by dynamic obscuring elements, the system may determine whether advertisement 500 is the topmost element at test points 502 at various times while crawling a web page displaying advertisement 500.

Figure 8:
FIG. 8 is an illustrative diagram showing an advertisement that is obscured by an obscuring element within the advertisement that may be detected, in accordance with an embodiment of the present invention.

In some situations, a web page element such as an advertisement may be partially obscured by an obscuring element that is smaller than the advertisement as shown in FIG. 8. In the example of FIG. 8, one test point 502C is obscured by an obscuring element 800 that is smaller than the advertisement 500 over which it is displayed. Obscuring elements of this type can be undesirable or, in some situations, can be acceptable or expected obscurations. For example, element 800 may be an "Ad Choices" icon that is meant to be collocated with advertisement 500. An advertisement discovery and tracking system may determine that advertisement 500 is obscured by element 800 and may also determine whether element 800 is an acceptable obscuration (e.g., by determining whether element 800 is close to or included within a portion of a DOM at which the advertisement is located such as within a containing iframe of the advertisement).

Figure 9:
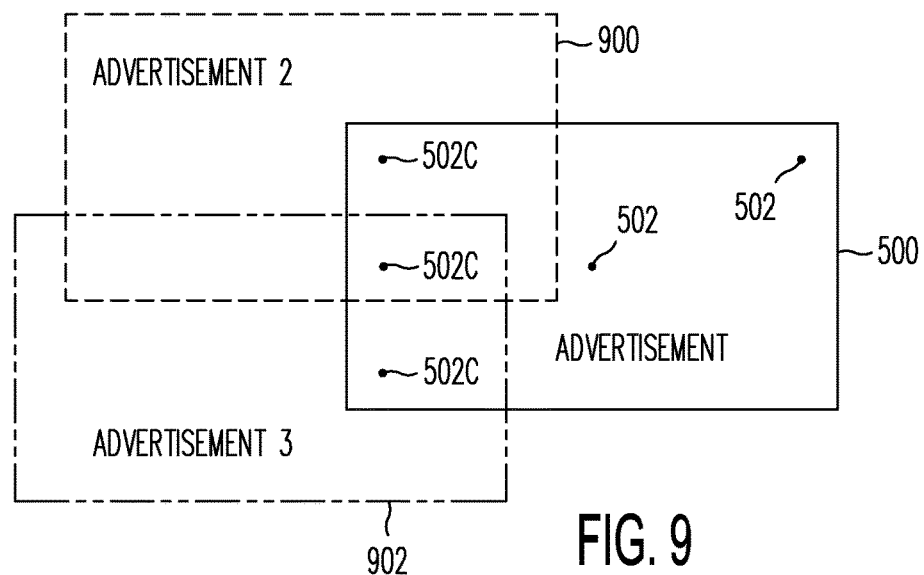
FIG. 9 is an illustrative diagram showing an advertisement that is obscured by multiple obscuring elements that may be detected, in accordance with an embodiment of the present invention.

In some situations, a web page element such as an advertisement may be obscured by more than one obscuring element as shown in FIG. 9. In the example of FIG. 9, advertisement 500 is obscured by a second advertisement 900 and a third advertisement 902. An advertisement discovery and tracking system may determine that advertisement 500 is obscured and, if desired, may also determine by how many obscuring elements the advertisement is obscured (e.g., by detecting other advertisements having the same location and/or size of the advertisement or by successively disabling the topmost element at the location of the advertisement that is not the advertisement until the advertisement is the topmost element and tracking the number of elements that have been disabled).

The examples of FIGS. 5, 6, 7, 8, and 9 have been discussed in relation to an obscured advertisement. However, it should be appreciated that the systems and methods disclosed herein may be used to determine whether any suitable online content is obscured.

Figure 10:
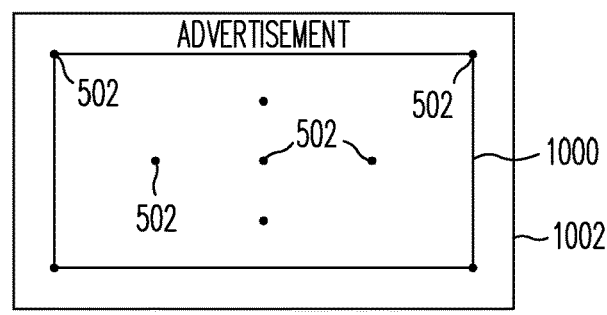
FIG. 10 is an illustrative diagram showing various test points that may be used to detect an obscured advertisement, in accordance with an embodiment of the present invention.

In order to detect and/or analyze visibly obscured web page elements such as obscured advertisements, one or more test points 502 may be selected within the area of the advertisement. FIG. 10 shows an example distribution of test points that may be selected and used to determine whether an element such as advertisement 500 is obscured. In the example of FIG. 10, a box 1000 located within the outer edge 1002 of advertisement 500 is shown. Box 1000 may be determined by obtaining the pixel coordinates (e.g., the x-y coordinates) defining the outer edge 1002 (e.g., a bounding box having a width and a height) of advertisement 500 (e.g., as determined from the DOM for the webpage), and choosing a box size that is smaller than and located within the outer edge 1002. The corners of box 1000 may then be selected as test points 502. Additional test points 502 such as a test point at the center of box 1000, a test point in the lower third of box 1000, a test point in the upper third of box 1000, a test point in the left third of box 1000, and/or a test point in the right third of box 1000 may be selected.

According to various embodiments, any or all of the test points described in connection with FIG. 10 may be used, additional test points may be selected, or fewer test points may be used, as desired. In one embodiment, it may be determined that the selected set of test points is insufficient for determining whether the advertisement is obscured and/or for locating a clickable point on the advertisement and one or more additional test points may be iteratively selected until it is determined whether that advertisement is obscured and/or a clickable location is found.

Figure 11:
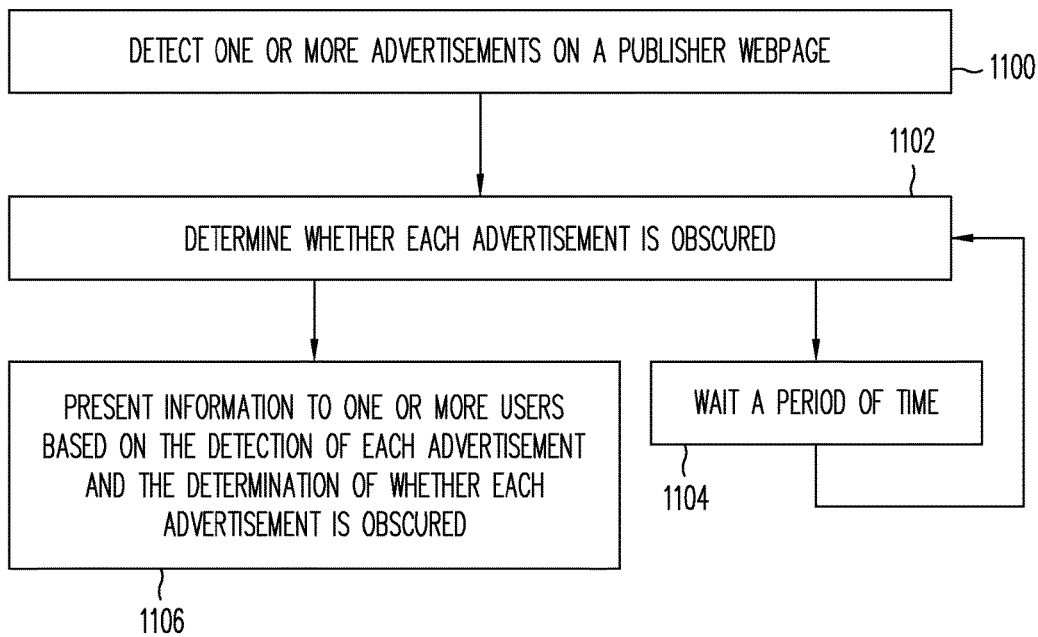
FIG. 11 is a flow chart of illustrative steps that may be used in identifying and reporting obscured and unobscured advertisements in accordance with an embodiment of the present invention.

Illustrative steps that may be performed for detecting visibly obscured web page elements such as visibly obscured advertisements and taking suitable action based on the detection are shown in FIG. 11. It should be appreciated that the processes described in connection with FIG. 11 may be performed as a standalone operation or may be performed as a portion of an operation to detect advertisements and placement pathways by which the advertisements were placed on the web page and to provide associated advertisement information to a customer.

At step 1100, one or more web page elements such as advertisements on a publisher web page may be detected by a system such as system 10 of FIG. 1. Detecting advertisements on a publisher web page may include using a web crawler to load the web page and one or more associated links on the web page and detecting one or more links to advertiser creatives in code such as HTML code for the web page (e.g., within the DOM associated with the web page).

At step 1102, the system may determine whether each advertisement is visible on the web page or is obscured (e.g., visibly obscured or blocked from view by an obscuring element on the web page). Further details of processes that may be performed for determining whether an advertisement is obscured are discussed, for example, hereinafter.

At step 1104, the system may wait a period of time such as one second, five seconds, ten seconds, one minute, a fraction of a second, between one second and one minute, or more than one minute (as examples). After waiting the period of time, the system may return to step 1102 and determine whether each advertisement is obscured. In this way, the system may detect advertisements that are temporarily obscured (e.g., by dynamic content on the web page).

At step 1106, the system may present information to one or more users such as customers based on the detection of each advertisement and based on the determination of whether each advertisement is obscured. For example, the system may gather advertisement data by capturing a screenshot of an unobscured advertisement, capturing a screenshot of a web page containing an unobscured advertisement, determining placement pathways by which obscured and/or unobscured advertisements were placed on the web page, storing obscuration information associated with obscured advertisements, and/or tracking changes associated with the placement and viewership of unobscured advertisements, and may provide the advertisement data and/or summary data (e.g., charts, graphs, statistics, etc.) associated with the advertisement data to the user via a customer web page or direct user contact transmission such as a text message, email, or social media message.

Figure 12:
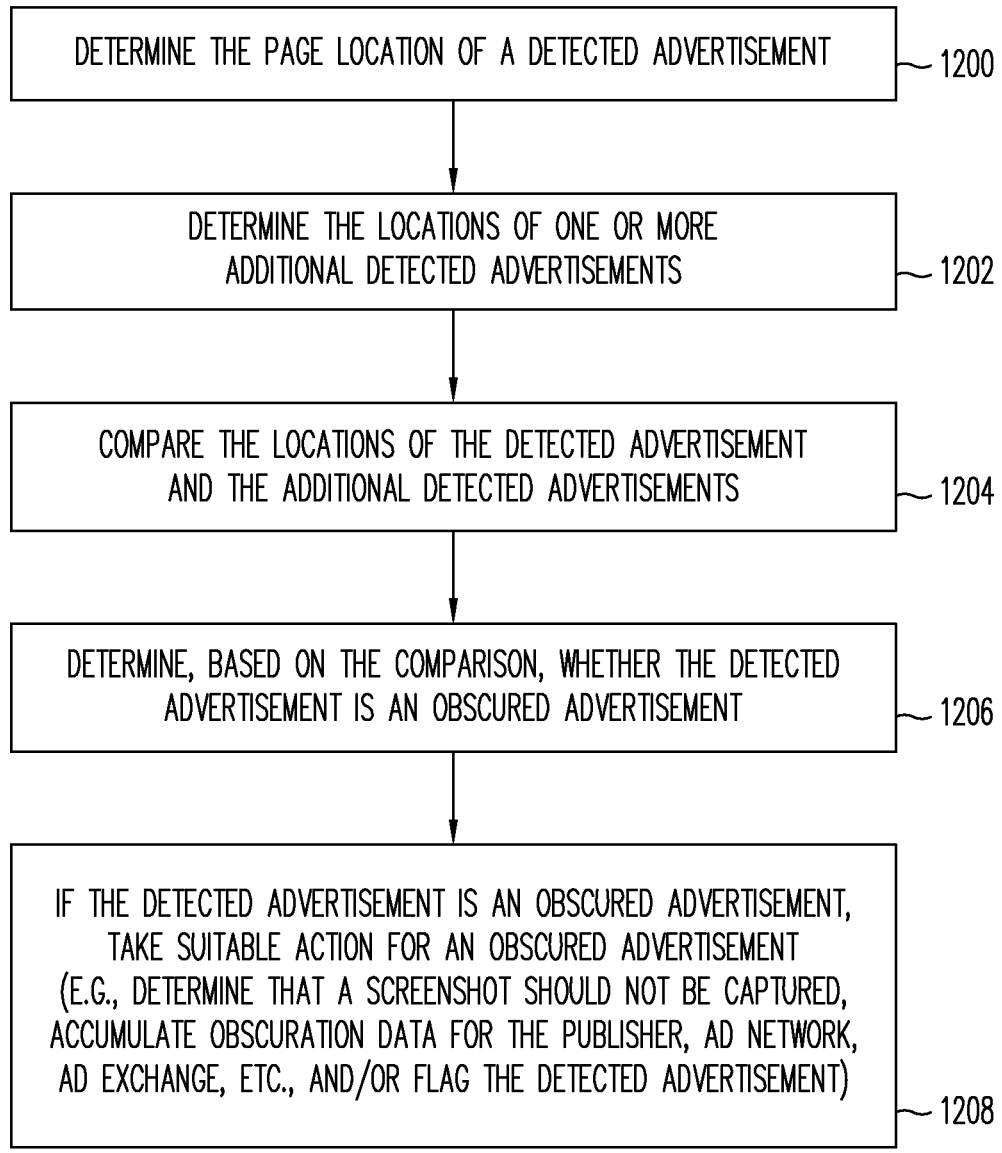
FIG. 12 is a flow chart of illustrative steps that may be used in determining whether a detected advertisement is obscured in accordance with an embodiment of the present invention.

In some situations, an advertisement may be visibly obscured by one or more additional advertisements. Illustrative steps for determining that an advertisement is obscured by another advertisement are shown in FIG. 12.

At step 1200, a system such as system 10 of FIG. 1 may determine the page location of a detected advertisement (e.g., an advertisement detected as described above in connection with step 1100 of FIG. 11). For example, advertisement discovery and tracking equipment may be used to extract, from the DOM associated with the web page on which the advertisement was detected, the coordinates (e.g., x and y pixel coordinates) describing the position and/or size of the detected advertisement.

At step 1202, the locations of one or more additional advertisements may be determined.

At step 1204, the locations of the detected advertisement and the additional advertisements may be compared.

At step 1206, the system may determine, based on the comparison, whether the detected advertisement is an obscured advertisement (e.g., whether the detected advertisement is obscured by one or more of the additional advertisements). For example, the system may determine that the detected advertisement is obscured if one or more of the additional advertisements has a location (e.g., a size and position) that at least partially overlaps the location of the detected advertisement.

At step 1208, if the detected advertisement is an obscured advertisement, the system may take suitable action for an obscured advertisement. Suitable action for an obscured advertisement may include determining that a screenshot of the advertisement and/or a screenshot of the web page should not be taken, accumulating obscuration data for the publisher of the web page or for an advertising channel (e.g., ad network, ad exchange, etc.) that placed the advertisement on the web page, and/or flagging the detected advertisement in a presentation of the advertisement and/or summary information associated with the advertisement for a customer.

Accumulating obscuration data may include determining a number and/or a percentage or fraction of advertisements that are provided on a particular web page or that are placed through a particular advertising channel and that are obscured. Flagging the detected advertisement may include providing a screenshot of the advertiser creative on the web page and providing a notice such as an exclamation point, flag icon, or other visual indicator that the advertisement creative, when presented on the web page, was at least partially obscured.

Suitable action for an obscured advertisement may also include storing data such as obscuration data, detected advertisement data, flagged advertisement data, and/or other advertisement to a database such as a user accessible database.

Figure 13:
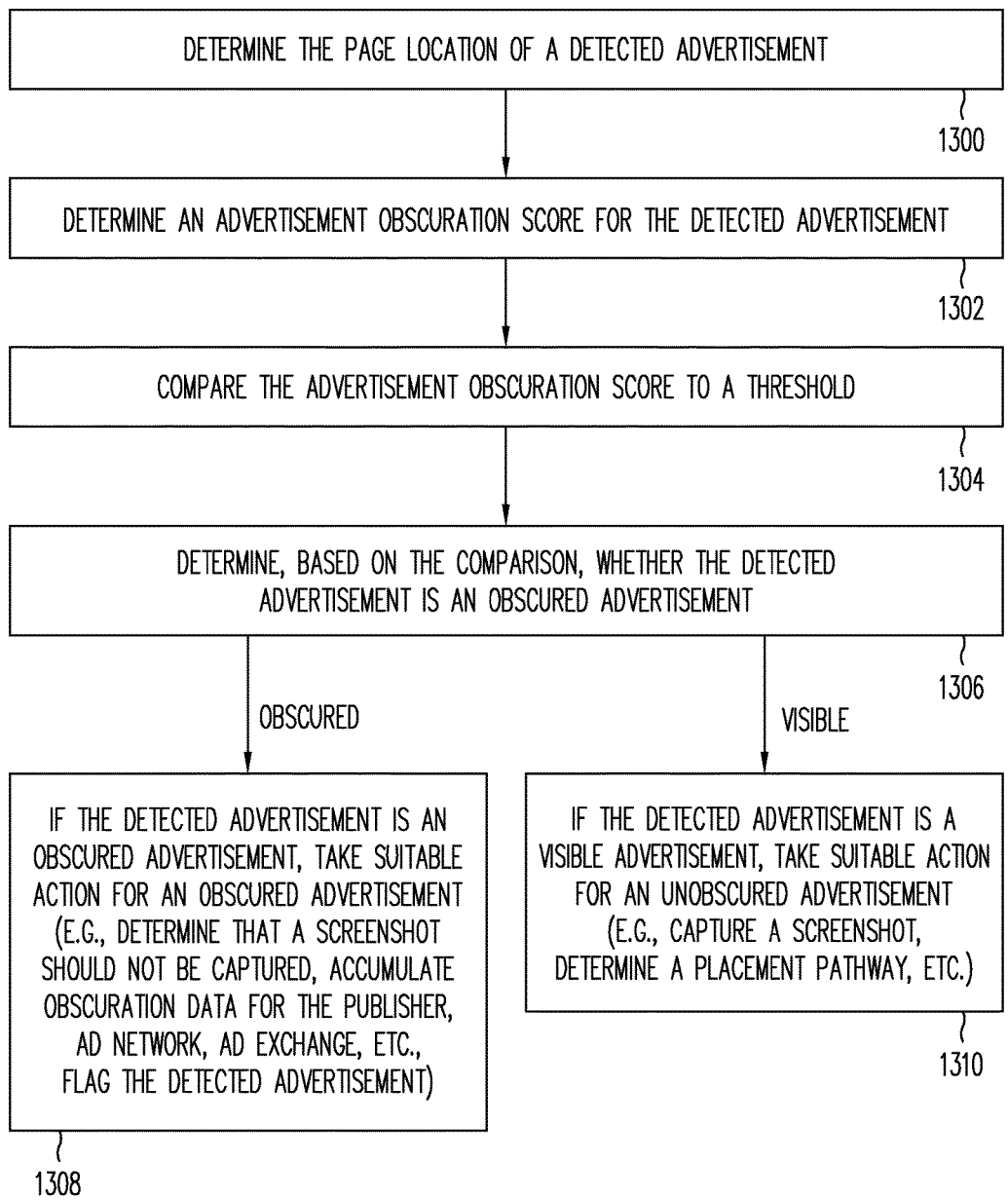
FIG. 13 is a flow chart of illustrative steps that may be used in determining whether a detected advertisement is obscured in accordance with another embodiment of the present invention.

Illustrative steps that may be performed for another process of determining that a web page element such as an advertisement is visibly obscured are shown in FIG. 13.

At step 1300, a system such as system 10 of FIG. 1 may determine the page location of a detected advertisement (e.g., an advertisement detected as described above in connection with step 1100 of FIG. 11). For example, advertisement discovery and tracking equipment may be used to extract, from the DOM associated with the web page on which the advertisement was detected, the coordinates (e.g., x and y pixel coordinates) describing the position and/or size of the detected advertisement.

At step 1302, the system may determine an obscuration score for the detected advertisement. Further details of processes that may be performed for determining an obscuration score for a detected element such as an advertisement are discussed, for example, hereinafter. The advertisement obscuration score may be, as examples, a fraction or a percentage of the advertisement creative or advertisement block that is obscured, a fraction or a percentage of the advertisement creative or advertisement block that is visible, a fraction or a percentage of the displayed time of the advertisement that the advertisement is at least partially obscured or at least partially visible, or a combination these.

At step 1304, the advertisement obscuration score may be compared to a threshold. The threshold may be, as examples, 10 percent, 20 percent, 50 percent, 75 percent or 100 percent.

At step 1306, the system may determine, based on the comparison of the advertisement obscuration score to the threshold, whether the detected advertisement is an obscured advertisement. For example, if an obscured percentage of the advertisement is greater than or equal to the threshold, the detected advertisement may be determined to be an obscured advertisement.

As another example, if the obscured percentage of the advertisement is less than or equal to the threshold, the detected advertisement may be determined to be a visible advertisement. As another example, if a visible percentage of the advertisement is less than or equal to the threshold, the detected advertisement may be determined to be an obscured advertisement. As another example, if the visible percentage of the advertisement is greater than or equal to the threshold, the detected advertisement may be determined to be a visible advertisement.

At step 1308, if the detected advertisement is an obscured advertisement, the system may take suitable action for an obscured advertisement. Suitable action for an obscured advertisement may include determining that a screenshot of the advertisement and/or a screenshot of the web page should not be taken, accumulating obscuration data for the publisher of the web page or advertising channel (e.g., ad network, ad exchange, etc.) that placed the advertisement on the web page, flagging the detected advertisement in a presentation of the advertisement and/or summary information associated with the advertisement for a customer, and/or storing advertisement data in a database as, for example, described above in connection with step 1208 of FIG. 12.

At step 1310, if the detected advertisement is an unobscured (visible) advertisement, the system may take suitable action for an unobscured advertisement. Suitable action for an unobscured advertisement may include capturing a screenshot of the advertisement, capturing a screenshot of the web page containing the advertisement, determining a placement pathway by which the advertisement was placed on the web page, and/or gathering other information regarding the advertisement or campaign associated with the advertisement (as examples).

Suitable action for an unobscured advertisement may also include storing data such as a screenshot (e.g., a screenshot of a web page containing an advertisement image or a screenshot of the advertisement image on the web page without including other portions of the web page), a creative, and/or other gathered and/or processed advertisement data to a database such as a user accessible database.

Determining the placement pathway by which the advertisement was placed on the web page may include using web crawlers 22 to load a given publisher website and gather HTTP request data associated with each HTTP request that is made while loading that publisher website, storing the HTTP request data as a HTTP request list (e.g., a list of data blocks associated with each HTTP request), processing the HTTP request list to form processed advertisement data that includes information associated with advertisements and advertising channels associated with the advertisement, and providing the processed advertisement data to data analysis and storage equipment such as data analysis and storage equipment 17.

The HTTP request data may include information associated with each HTTP request such as a URL of the request, a time of the request, a response body of the response to the request (e.g., the HTML, JavaScript code or other code of the page associated with the request), an HTTP response code of the response to the request (e.g., a success, failure, or redirect response), and a redirect response header (e.g., a web page or other resource that a browser is redirected to in the case of a redirect response code).

Advertisement discovery equipment 12 may use the time, the response body, and/or the redirect response header of multiple requests to determine the pathway by which a given advertisement has been placed on a publisher web page.

For example, a URL of a particular HTTP request associated with an advertisement may be the URL of an advertisement creative (e.g., an image, an animation, a video, etc.). Advertisement discovery equipment 12 may identify an advertisement request time associated with that HTTP request. Advertisement discovery equipment 12 may search the HTTP request data associated with other HTTP requests having earlier associated times than the time of the particular HTTP request with the advertisement. For example, advertisement discovery equipment 12 may search the previous requests for redirect response headers and/or response bodies that include references to the URL of the particular HTTP request associated with the advertisement. In this way, a cause and effect relationship between HTTP requests may be determined and used to identify the pathway by which a given advertisement has been placed on a publisher web page.

Advertising discovery equipment 12 may generate processed advertisement data that represents, for each publisher website, the identified advertisements on that website, information indicating whether the advertisements are obscured, and the identified pathways by which the identified advertisements were placed on that website. If desired, the processed advertisement data may include additional information related to content on a publisher website that represents, for each publisher website, other identified content on that website, obscuration information for the other identified content, and identified pathways by which the other identified content was placed on that website.

Figure 14:
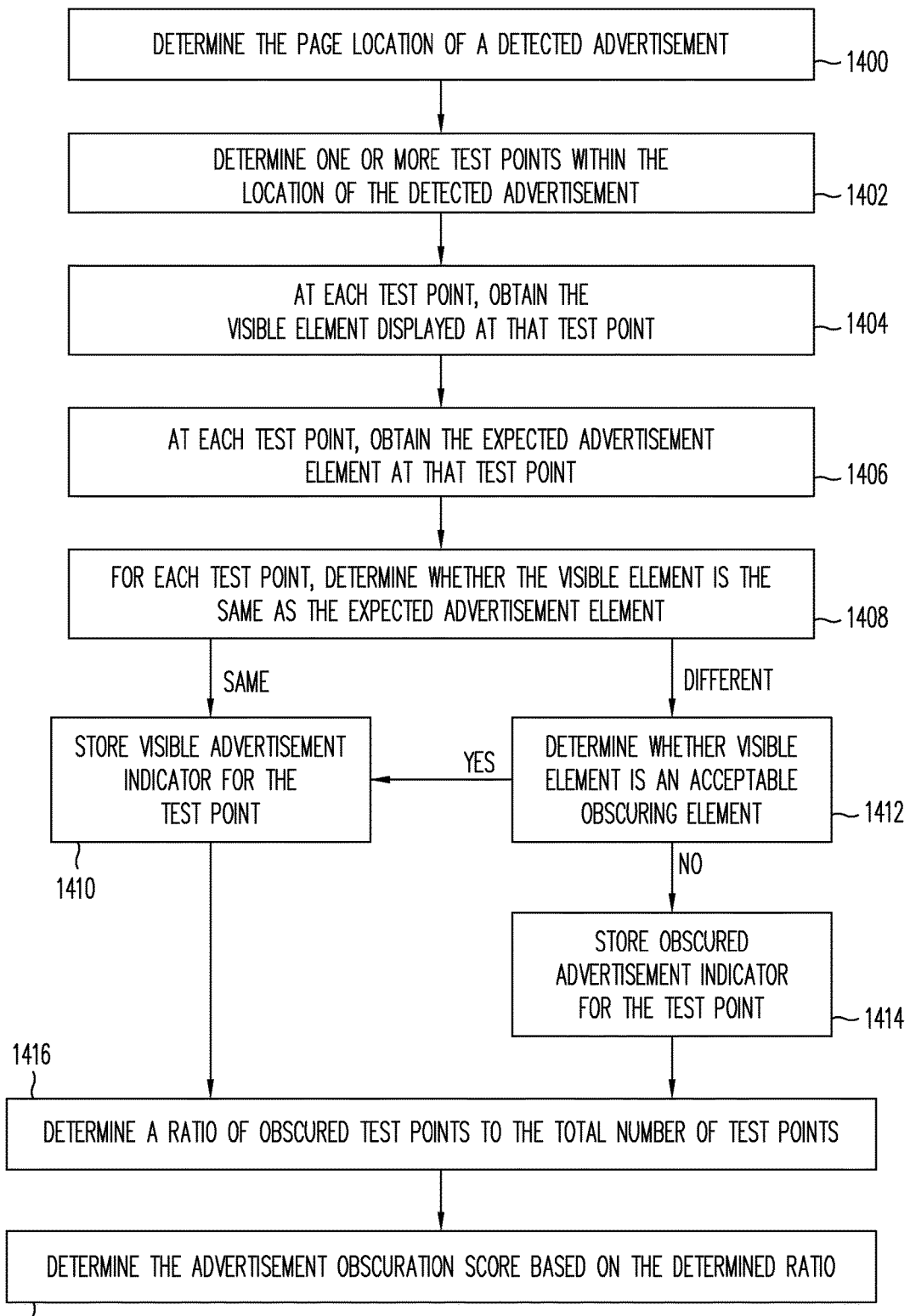
FIG. 14 is a flow chart of illustrative steps that may be used in determining an advertisement obscuration score in accordance with an embodiment of the present invention.

Illustrative steps that may be performed for determining an advertisement obscuration score are shown in FIG. 14.

At step 1400, a system such as system 10 of FIG. 1 may determine the page location of a detected advertisement (e.g., an advertisement detected as described above in connection with step 1100 of FIG. 11). Determining the page location may include determining the coordinates of a bounding box for the advertisement, an iframe associated with the advertisement, a creative associated with the advertisement and/or an advertisement block associated with the advertisement.

At step 1402, one or more test points within the location of the advertisement may be determined. Test points may be determined, as examples, as described above in connection with FIG. 10. Each test point may, for example, include an x coordinate and a y coordinate of the location of the test point.

At step 1404, at each test point, the visible or topmost element at that test point may be obtained. The visible element may be obtained by requesting the visible element at the test point using a browser associated with a web crawler that is accessing the web page or may be determined by analyzing code for the web page.

At step 1406, at each test point, the expected advertisement element at that test point may be obtained. The expected advertisement element may be the value of a particular pixel in an image of the advertisement that is expected to be displayed at the x-y coordinates of the test point.

At step 1408, for each test point, the system may determine whether the obtained visible element is the same as the expected advertisement element.

At step 1410, if the visible element is the same as the expected advertisement element, a visible advertisement indicator for the test point may be stored. For example, a value of one may be stored for the test point that indicates that the advertisement is visible at that test point.

At step 1412, if the visible element is not the same as the expected advertisement element, the system may determine whether the visible element is an acceptable obscuring element. A visible element as described herein may be the topmost element displayed at a particular location and may include obscuring content that blocks the advertisement from view or may be a transparent element that, while displayed over the advertisement does not visibly obscure the advertisements.

Some visible elements that include obscuring content may be acceptable obscuring elements. For example, an acceptable obscuring element may be an element that is included with the advertisement such as an "Ad Choices" or similar icon that is intended to be placed over a portion of the advertisement.

Some transparent elements may also be acceptable obscuring elements. For example, an iframe associated with the advertisement may be located over the advertisement but may not visibly obscure the advertisement (i.e., the advertisement may be visible to a user even though the iframe is located over the advertisement).

The system may determine that an obscuring element is an acceptable obscuring element by determining, for example, that the obscuring element has the exact same size and location as the advertisement (e.g., one or more iframes such as containing iframes in which the advertisement is included may have the exact same size as the advertisement and may appear to be the visible element even though the displayed element is the advertisement within the iframe), that the obscuring element is entirely contained within the area of the advertisement, that the obscuring element is located relatively close to the advertisement in the DOM (e.g., within the same iframe or within 5 lines of code or 10 lines of code from the advertisement), that the obscuring element is provided by a common server as the advertisement, or otherwise determining that the visible element is an acceptable obscuring element.

In one example, the visible element or topmost element may be a containing iframe for the advertisement. In this example, the system may determine that multiple elements within the iframe appear to be obscuring elements but are, in fact, not visible to a user and are therefore acceptable obscuring elements.

If, at step 1412, the visible element is determined to be an acceptable obscuring element, the system may proceed to step 1410 and store a visible advertisement indicator for the test point as described above.

If, at step 1412, the visible element is determined to be an unacceptable obscuring element (e.g., another advertisement, publisher content, etc.) that prevents the advertisement from being seen by a viewer of the web page, the system may proceed to step 1414 and store an obscured advertisement indicator for the test point. For example, an obscured advertisement indicator may include a value of zero for the test point that indicates that the advertisement is obscured at that test point.

At step 1416, the system may determine a ratio of obscured test points to the total number of test points (or to the number of visible test points). For example, the system may determine a number of test points for which an obscured advertisement indicator was stored at step 1414 and may divide that number by the total number of test points or by the number of test points for which a visible advertisement indicator was stored. However, this is merely illustrative. In another embodiment, a ratio of visible test points to the total number of test points (or to the number of obscured test points) may be determined.

At step 1418, the advertisement obscuration score may be determined based on the determined ratio. For example, the advertisement obscuration score may be equal to the ratio, may be a percentage corresponding to the ratio or may otherwise be determined from the determined ratio.

Figure 15:
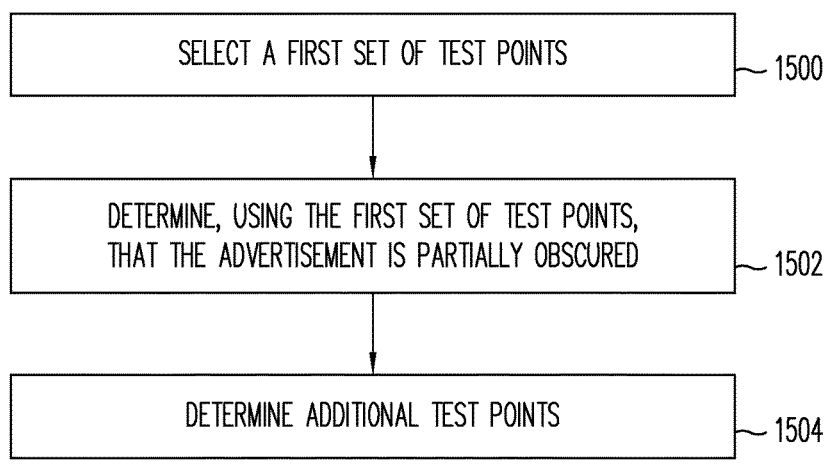
FIG. 15 is a flow chart of illustrative steps that may be used in dynamically determining test points for detection of obscured advertisements in accordance with an embodiment of the present invention.

Illustrative steps that may be performed for determining test points for advertisement obscuration determination operations are shown in FIG. 15.

At step 1500, a first set of test points may be selected. For example, the first set of test points may be a default set of test points that includes a test point at or near each corner of an advertisement, a test point at or near the center of the advertisement, and a test point at or near the top and/or bottom third of the advertisement. In one example, the first set of test points may be the test points described above in connection with FIG. 10. However, this is merely illustrative. In various embodiments, the first set of test points may include a single test point, six test points, tens of test points, hundreds of test points, or any suitable number of test points up to and including a test point for each pixel of the advertisement.

At step 1502, the system may determine, using the first set of test points, that the advertisement is partially obscured. For example, the system may determine that the advertisement is obscured at some of the test points.

At step 1504, in response to determining that the advertisement is partially obscured, the system may determine one or more additional test points. The additional test points may include test points in the left and right thirds of the advertisement and/or other test points for further determining an obscuration score for the advertisement and/or for locating a clickable location that is not obscured within the advertisement.

According to various embodiments, the operations described above in connection with FIGS. 11-15 may be performed by advertisement discovery equipment, data analysis and storage equipment and/or user interface equipment as desired. For example, in one embodiment, advertisement discovery equipment may perform all obscured advertisement analysis and only provide processed advertisement data for unobscured advertisements to data analysis and processing equipment. In another embodiment, advertisement discovery equipment may perform all obscured advertisement analysis and provide processed advertisement data for both unobscured and obscured advertisements, along with obscured advertisement data associated with any obscured advertisements, to data analysis and storage equipment. In another embodiment, advertisement discovery equipment may provide advertisement data for all advertisements on a web page along with raw obscuration information such as test point indicator values to data analysis and storage equipment and the data analysis and storage equipment may perform the operations for determining whether each advertisement is obscured.

Data analysis and processing equipment 17 may be used to accumulate and aggregate processed advertisement data received from advertisement discovery equipment 12. For example, equipment 17 may store the processed advertisement data in a first database, periodically obtain the data from the first database and sort and combine the obtained data using selected criteria. As examples, the selected criteria may include an advertiser, an advertising campaign, a publisher website, an ad creative, an ad service, an ad network, etc. The data that has been sorted and combined using these criteria may be used to form aggregated data that is provided to a second database (e.g., a database that is accessible by user interface equipment such as user interface equipment 18).

Figure 16:
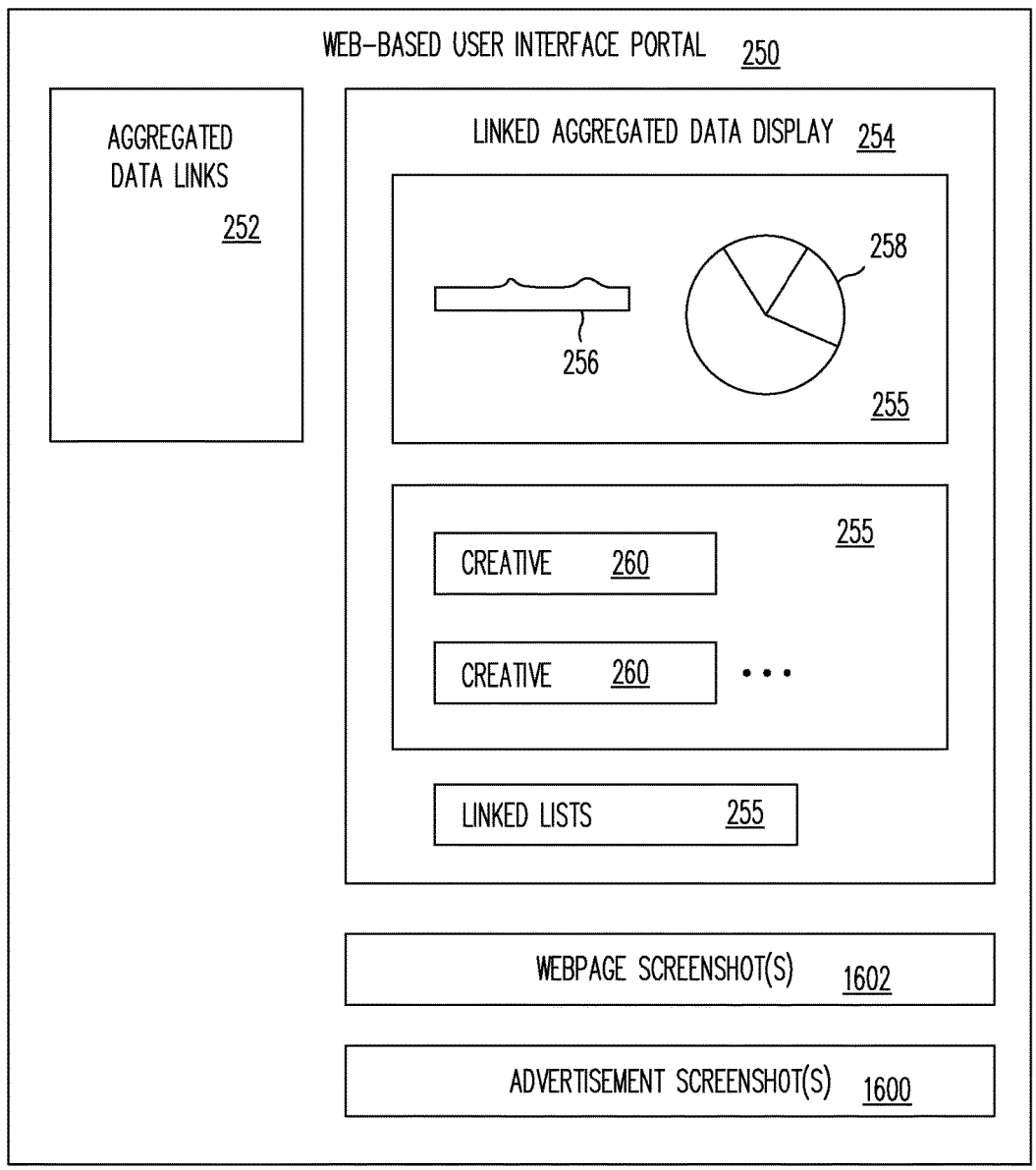
FIG. 16 is a diagram of an illustrative web-based user interface portal for providing aggregated advertisement data to a customer in accordance with an embodiment of the present invention.

FIG. 16 is a diagram of an illustrative web-based user interface portal that may be used to provide aggregated data to a customer. Web-based user interface portal 250 may, for example, be a web site that is accessible to a customer following authentication with a customer user name and password.

As shown in FIG. 16, web-based user interface portal 250 may include a set of links 252 to aggregated data such as aggregated advertisement data. Following links in aggregated data links 252 may provide a customer with lists such as lists 255, graphs such as graph 256, charts such as chart 258, advertising creatives 260, and/or other links, summaries or displays associated with the aggregated data. Each link in aggregated data links 252 may link a customer to a linked aggregated data display 254 that has been sorted according to a chosen criterion associated with that link. For example, clicking a first link may result in a display of lists, graphs, and additional links for exploring per-site data associated with particular websites and clicking a second link may result a display of lists, graphs, and additional links for exploring per-advertiser data associated with each of several particular advertisers.

As shown in FIG. 16, interface portal 250 may include one or more advertisement screenshots 1600 and/or one or more web page screenshots 1602. For example, an advertisement screenshot 1600 may be linked from one of creatives 260 and, when clicked, may cause the system to display an image of the advertisement in the context in which it was displayed on a particular web page along with information about that particular screenshot. Advertisement screenshots 1600 may be clickable images that, when clicked, cause the system to display one of web page screenshots 1602 from which the clicked advertisement screenshot was obtained showing the advertisement as it was displayed on the page.

Figure 17:
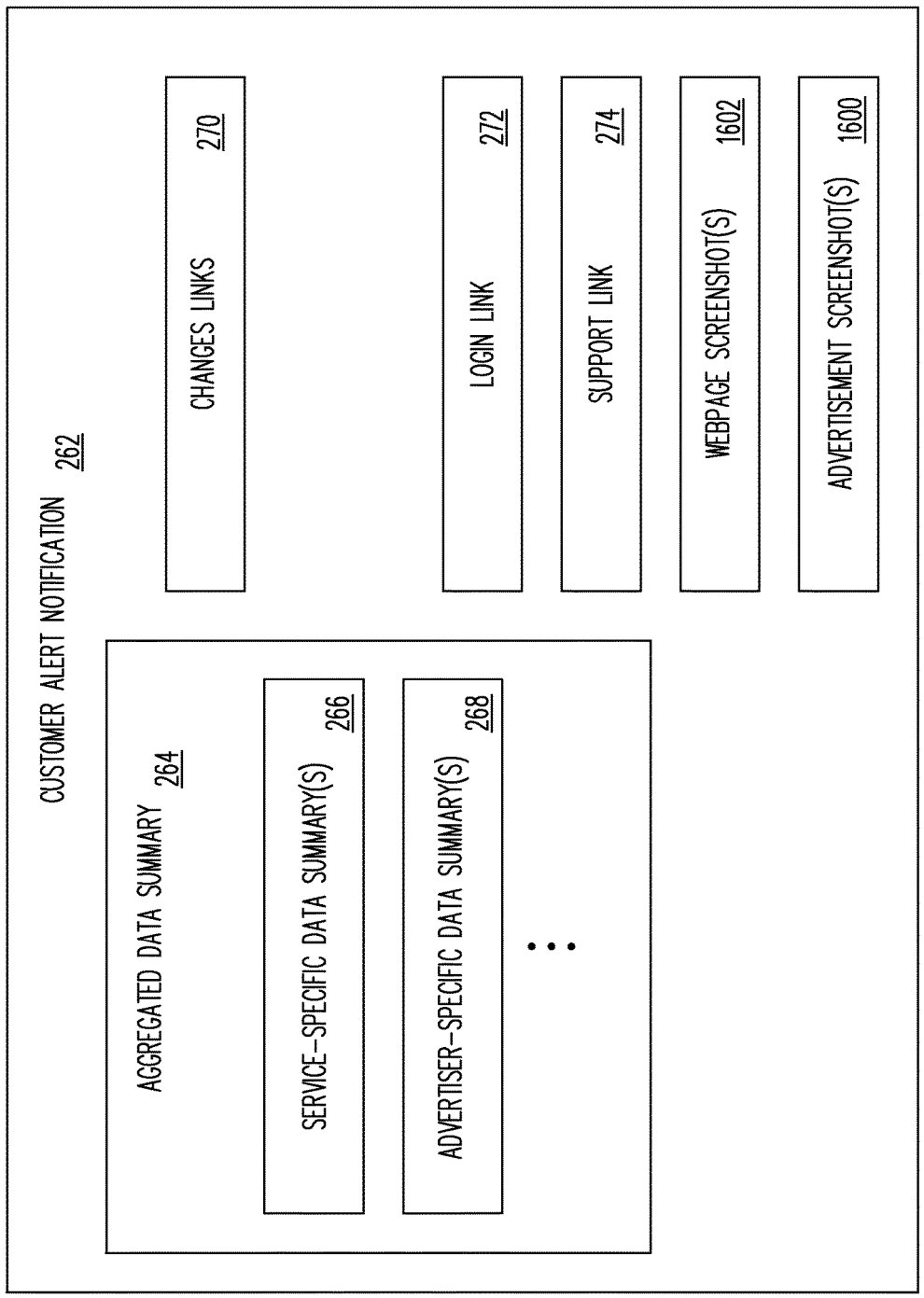
FIG. 17 is a diagram of an illustrative customer alert notification for providing aggregated advertisement data to a customer in accordance with an embodiment of the present invention.

If desired, in addition to or instead of providing access to a website such as web-based user interface portal 250 of FIG. 16, a customer may be provided with access to aggregated data by sending the customer an alert notification such as customer alert notification 262 of FIG. 17. Customer alert notification 262 may be an email, a text message, a social media message, or any other suitable direct contact message.

As shown in FIG. 17, notification 262 may include a summary 264 of the aggregated data. Summary 264 may include service-specific data summary 266 that is specific to a particular advertisement service, advertiser-specific data summary 268 that is specific to a particular advertiser, or any other data summary associated with the aggregated advertisement data. Notification 262 may include links such as clickable links for obtaining additional information associated with the aggregated data such as links 270 to information associated with changes in aggregated data with respect to a previous time period (e.g., the previous week), a login link 272 for directing the customer to a website such as web portal 250 of FIG. 16, and a support link such as support link 274 for directing the customer to help services for using or understanding system 10 and/or aggregated data.

Notifications such as notification 262 may be generated and sent to a customer periodically (e.g., daily, weekly or monthly) or in response to an identified change in advertising methods, channels or trends that may be of interest to the customer.

As shown, notification 262 may include links to advertisement screenshots 1600 and/or web page screenshots 1602.

The examples of FIGS. 16 and 17 are merely illustrative. If desired, customers may be provided with access to aggregated advertisement data through an API, through bulk file transfer, through printed paper reports or any other suitable medium for transmitting information.

Figure 18:
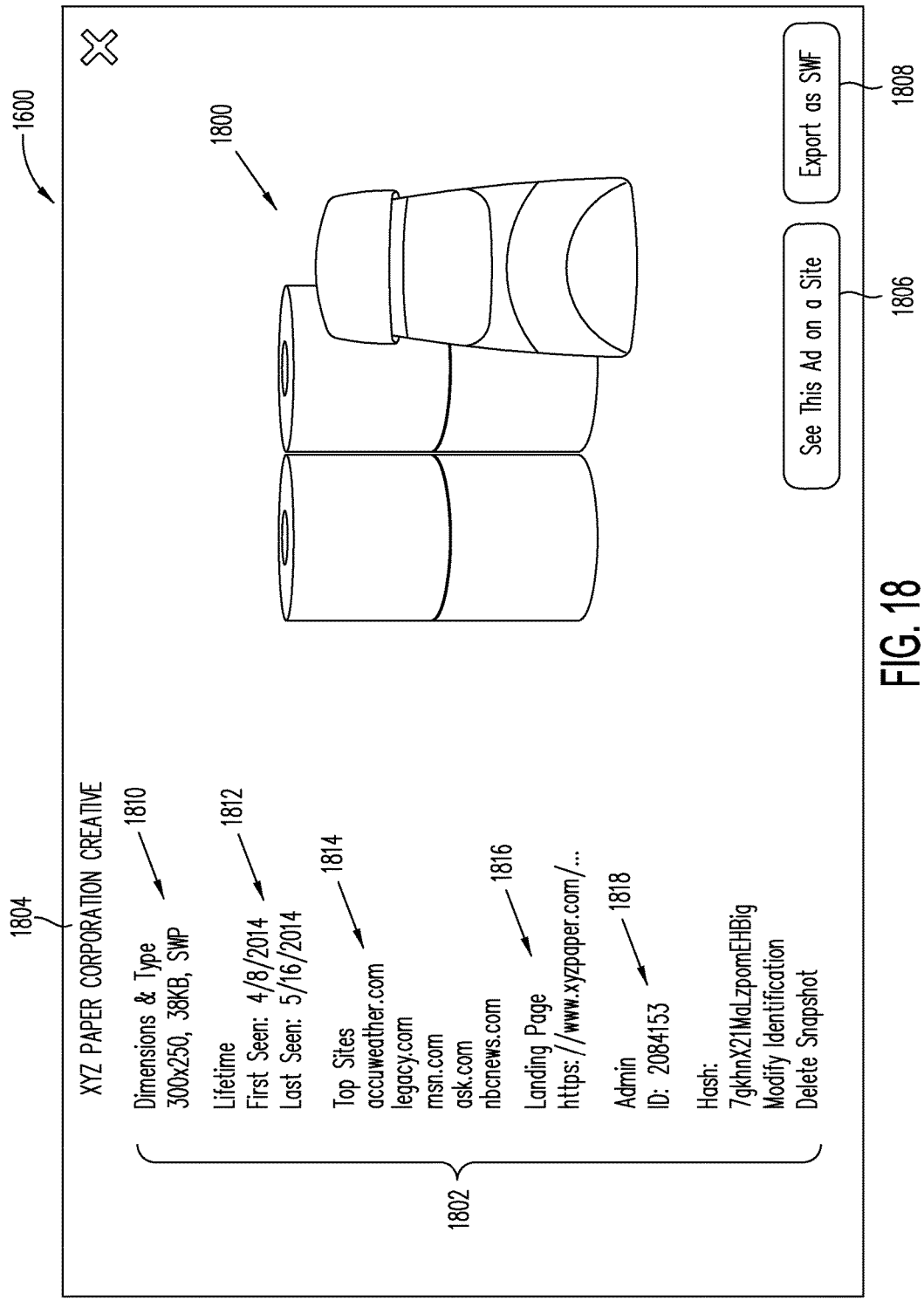
FIG. 18 is an illustrative diagram of an advertisement screenshot that may be provided to a user in accordance with an embodiment of the present invention.

FIG. 18 shows an example of an advertisement screenshot that may be provided to a user. As shown in FIG. 18, an advertisement screenshot 1600 that may be provided to a user such as a customer may include an image 1800 of the creative (e.g., a still image or a moving image or video), advertisement information 1802 for the creative, a title 1804 for the creative, and selectable or clickable options 1806 and 1808.

Advertisement information 1802 may include information associated with the creative such as file information 1810, creative lifetime information 1812, top sites information 1814 for the creative, landing page information 1816 for the creative, and/or administrative information 1818 for the creative. As shown, file information 1810 may include the pixel dimensions (e.g., 300×250 pixels), a file size (e.g., 38 KB), and/or a file type (e.g., SWF) of creative 1800.

Lifetime information 1812 may include a date on which the creative was first seen and a date on which the creative was last seen on a publisher web page. Top sites information 1814 may include a list of publisher web pages on which the creative most often appeared. Landing page information 1816 may include a landing page to which a user clicking on the creative would be directed. Administrative (Admin) information 1818 may include an identifier of the creative and/or other information or options for identifying and/or managing the screenshot of the creative.

Title 1804 may list the owner of the creative (e.g., XYZ Paper Corporation). Options 1806 and 1808 may include an export option such as an "Export as SWF" option that, when clicked, causes the system to provide a customer with an SWF file (for example) for the creative and/or a "See this Ad on a Site" option that, when clicked, causes the system to provide the customer with a web page screenshot showing the advertisement on a website.

Figure 19:
FIG. 19 is an illustrative diagram of a web page screenshot containing an advertisement that may be provided to a user in accordance with an embodiment of the present invention.

FIG. 19 shows an example of a web page screenshot that may be provided to a user. As shown in FIG. 19, a web page screenshot such as web page screenshot 1602 may include an image 1901 of a web page on which creative 1800 was displayed, showing the creative 1800 in situ on the web page as it was displayed among other content such as publisher content 1900 (e.g., articles and/or other publisher provided information).

The foregoing is merely illustrative of the principles of this invention and various modifications can be made by those skilled in the art without departing from the scope and spirit of the invention.

What is claimed is:

1. A system, comprising:
computing equipment including processing circuitry configured to:
   access a publisher web page;
   detect a digital element displayed on the publisher web page responsive to the access of the publisher web page;
   determine whether the digital element is obscured by another digital element displayed on the publisher web page responsive to the access of the publisher web page; and
   provide information associated with the digital element to a user in response to the determination, wherein the digital element comprises an electronic advertisement, wherein the computing equipment comprises advertisement discovery equipment and wherein the processing circuitry is configured to determine whether the digital element is obscured by the another digital element by determining, at a plurality of test points each corresponding to a pixel coordinate within the electronic advertisement, whether an expected value of the electronic advertisement for that pixel coordinate is a visible element of the publisher web page at that pixel coordinate.

2. The system of claim 1, wherein the processing circuitry is further configured to determine, if the expected value of the electronic advertisement is not the visible element at a selected one of the plurality of test points, whether the visible element at that test point is an acceptable obscuring element.

3. The system of claim 1, wherein the processing circuitry is further configured to determine a clickable location on the electronic advertisement based on a selected one of the plurality of test points at which the electronic advertisement is the visible element.

4. The system of claim 1, further comprising user interface equipment including communications circuitry configured to provide the information associated with the digital element to the user responsive to the determination of whether the digital element is obscured by providing a web-based user interface portal or a user alert notification including the information to the user.

5. A method of identifying visibly obscured web-based advertisements on web pages using a system having advertisement discovery equipment, the method comprising:
    with the advertisement discovery equipment, loading a publisher web page to cause placement of an electronic advertisement on the publisher web page;
    with the advertisement discovery equipment, detecting the electronic advertisement on the publisher web page;
    with the advertisement discovery equipment, determining whether the electronic advertisement is obscured by another electronic element displayed on the publisher web page responsive to the loading of the publisher web page; and
    with the advertisement discovery equipment, providing advertisement information associated with the advertisement to a user based on the detecting and the determining, wherein the determining comprises:
        determining an obscuration score for the advertisement, wherein the determining of the obscuration score comprises:
            obtaining, at each of the plurality of pixels within a pixel boundary of the electronic advertisement, a visible element displayed on the web page;
            obtaining, at each of the plurality of pixels, an expected element of the advertisement; and
            determining, at each of the plurality of pixels, whether the obtained visible element is the same as the obtained expected element; and
        determining whether the advertisement is obscured based on the obscuration score.

6. The method of claim 5, wherein the determining comprising:
    determining a location of the advertisement on the publisher web page;
    determining a location of at least one additional advertisement on the publisher web page; and
    determining whether the location of the at least one additional advertisement at least partially overlaps the location of the advertisement.

7. The method of claim 5, further comprising comparing the obscuration score to a threshold, wherein the determining whether the advertisement is obscured based on the obscuration score comprises determining whether the advertisement is obscured based on the comparison of the obscuration score to the threshold.

8. The method of claim 5, wherein the determining of the obscuration score further comprises:
    in response to determining that, at a particular one of the plurality of pixels, the obtained visible element is not the same as the obtained expected element, storing an obscured advertisement indicator for that pixel; and
    determining a ratio of obscured pixels to a total number of test points based on a number of pixels for which the obscured advertisement indicator was stored.

9. The method of claim 5, wherein the determining of whether the advertisement is obscured comprises determining that the advertisement is obscured and wherein the providing of the advertisement information associated with the advertisement to the user based on the detecting and the determining comprises at least one of determining that a screenshot of the advertisement should not be captured, accumulating obscuration data associated with the advertisement, or flagging the advertisement as an obscured advertisement.

10. The method of claim 5, wherein the determining of whether the advertisement is obscured comprises determining that the advertisement is visible and wherein the providing of the advertisement information associated with the advertisement to the user based on the detecting and the determining comprises at least one of capturing a screenshot of the advertisement, capturing a screenshot of the publisher web page containing the advertisement, or determining a placement pathway by which the advertisement was placed on the publisher web page.

\* \* \* \* \*